March 13, 1962  A. M. EDMUNDS  3,024,913
POROUS DISTRIBUTOR PLATE ASSEMBLY
Filed July 24, 1957  5 Sheets-Sheet 1
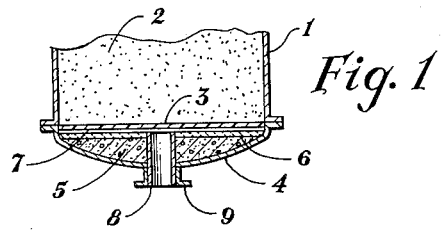
Fig. 1
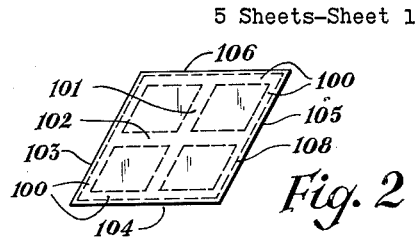
Fig. 2
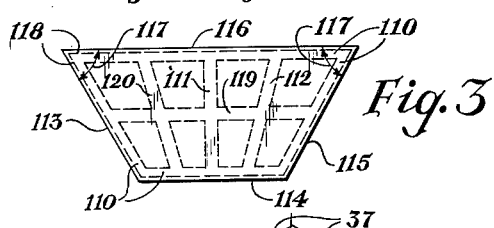
Fig. 3
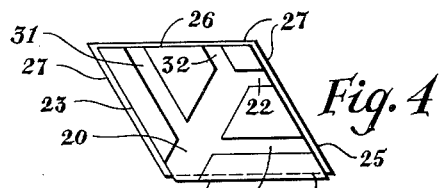
Fig. 4
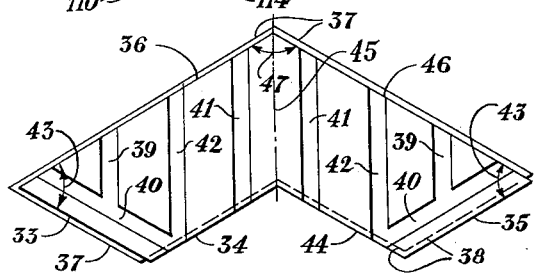
Fig. 5
Fig. 6
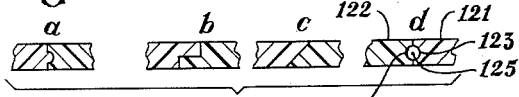
Fig. 12
Fig. 7
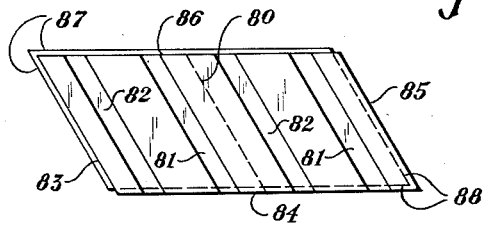
Fig. 8
Fig. 9
Fig. 13
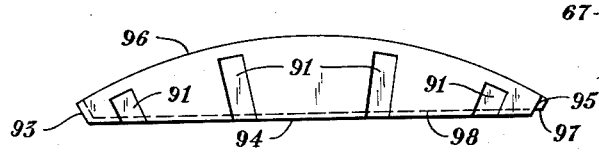
Fig. 11
INVENTOR.
Alvin M. Edmunds
BY
Griswold & Burdick
ATTORNEYS INVENTOR.
Alvin M. Edmunds

BY

*Griswold & Burdick*
ATTORNEYS

March 13, 1962 A. M. EDMUNDS 3,024,913
POROUS DISTRIBUTOR PLATE ASSEMBLY
Filed July 24, 1957 5 Sheets-Sheet 4

INVENTOR.
Alvin M. Edmunds
BY
Griswold & Burdick
ATTORNEYS

March 13, 1962 A. M. EDMUNDS 3,024,913
POROUS DISTRIBUTOR PLATE ASSEMBLY
Filed July 24, 1957 5 Sheets-Sheet 5

INVENTOR.
Alvin M. Edmunds
BY
Griswold & Burdick
ATTORNEYS

United States Patent Office 3,024,913
Patented Mar. 13, 1962

3,024,913
POROUS DISTRIBUTOR PLATE ASSEMBLY
Alvin M. Edmunds, Midland, Mich., assignor to The Dow Chemical Company, Midland, Mich., a corporation of Delaware
Filed July 24, 1957, Ser. No. 673,924
1 Claim. (Cl. 210—293)

This invention relates to a porous distributor plate assembly, and more particularly to a porous distributor plate assembly made of synthetic resin compositions.

In ion exchange and sand filter bed operations using a tower, for example, as a container for ion exchange resin or the filter material, it is necessary to provide a support at the bottom of the tower for the resin or the filter medium and at the same time provide a method for collecting the treated product which is generally a liquid. In these operations, backwashing is necessary and requires a means of dispersing the backflow of fluid evenly through the bed. In ion exchange treatment of water, for example, anion and cation exchange resins are often added to a tower and intermixed by blowing air up through the bed. The water is then processed by passing it into the bed of the intermixed resins. After they become spent, the anion and cation resins are separated by backwashing with water, regenerated separately, and then again intermixed, as by airblowing, for water-processing. Thus, a distribution means at the bottom of the tower is necessary which will support the resin bed and also serve as a distributor to evenly distribute fluid to be passed through the bed. If during the blowing of the bed, the air is not evenly distributed, mixing will be accomplished only over part of the bed and the bed will not be level but will be shifted to one side. When put into use this results in an unequal flow of water, for example, through the bed so that only part of it is utilized in treating the water. This same problem exists with backwashing where ion exchange resins are employed in other chemical processing, such as in ion exclusions, and also where a filter medium is used. In conventional ion exchange equipment, perforated pipe laterals extending from a center outlet are presently generally employed. These laterals are embedded in a sub-fill of graded gravel or anthracite coal which acts as support for the resin or the sand. With this equipment, often during the backwashing operation, the sub-fill is shifted allowing the resin or the filter medium to enter the lateral pipes and become lost by being thus washed from the tank or tower.

In U.S. Patent Nos. 2,670,338 and 2,670,339, granted to instant inventor, molded articles of porous resin compositions are made by intermixing a self-hardening thermosetting resin, such as phenol-formaldehyde and furan resin, with a substantially inert granular filler. The resin compositions disclosed and thermoplastic compositions, such as styrene, and similar thermosetting compositions, such as epoxy resins, are inert to acids, alkalis, and most solvents and may be very well adapted to be used as a porous distributor tray. However, attempts to form large articles such as a distributor tray for ion exchange and filter beds have not been successful. It has been found impractical to attempt to cast these trays in tanks or towers in one piece, i.e. as a monolithic structure, due to the confined working space and difficulties encountered with defects, such as variations in thickness, cracking due to shrinkage etc., which require scrapping of the tray. Also when casting these trays in one piece, channels in the tray must be made to allow for flow from different parts of the tray to the outlet. This network of channels has to be formed by using aluminum or other metal tubing which is subsequently removed as by dissolving with acids or caustic. This is a costly and time consuming operation.

It is, therefore, the principal object of this invention to provide an improved porous distributor tray assembly of synthetic resin compositions which overcomes the disadvantages of assemblies heretofore used. A further object is to provide a porous plate assembly which is formed from only relatively few basic pieces capable of being assembled into the desired plate to fit different size towers and tanks. Other objects and advantages will become apparent as the description of this invention proceeds, reference being had to the accompanying drawing in which:

FIGURE 1 diagrammatically shows a cross-section of the porous distributor tray of the invention installed in the bottom of a dished head tower.

FIGURES 2 and 3 show the plates having a form capable of being assembled in multiples according to the invention to form a distributor assembly of desired size for installation as required for the equipment involved.

FIGURES 4, 5, 6, 7, 8, 9, and 11 show the lower face of individual plates that may be used in building up a distributor tray.

FIGURE 12 shows means that may be used to interfit the plates.

FIGURE 13 is a cross-section on the line 13—13 of FIGURE 7.

Figure 21:
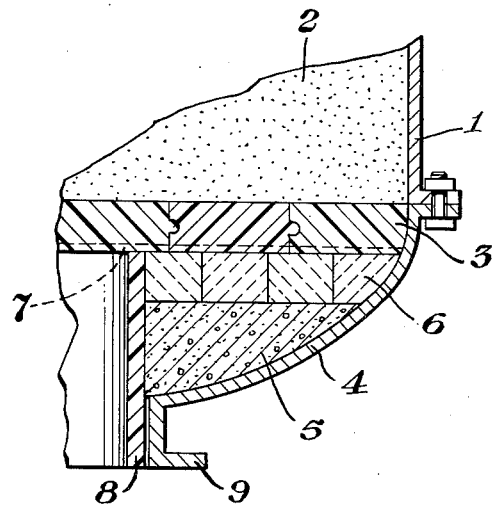
FIGURE 21 is an enlarged sectional view of FIGURE 1 showing the installation of the porous distributor tray in more detail.

Referring to the drawing in detail, in FIGURES 1 and 21 a schematic cross-sectional view of an installation of the distributor tray is shown. In this installation a cylindrical tower 1 is filled with ion exchange resin or a filter medium 2 which is supported on the distributor tray 3. In the installation, the dished head 4 of the tower is filled with concrete 5 on which carbon, graphite, or low porosity chemically resistant bricks 6 are cemented together to protect the concrete. Distributor tray 3 assembled according to the invention as hereinafter explained, of synthetic resin composition is cemented to the brick 6. The lower face 7 (also see FIGURE 10) is placed adjacent to the upper surface of the bricks 6. This tray 3 obtained by the assembly of the interfitting plates is hexagonal in shape and the plates forming the periphery of the tray are trimmed so as to obtain a circular form as indicated to fit into the tower.

Figure 10:
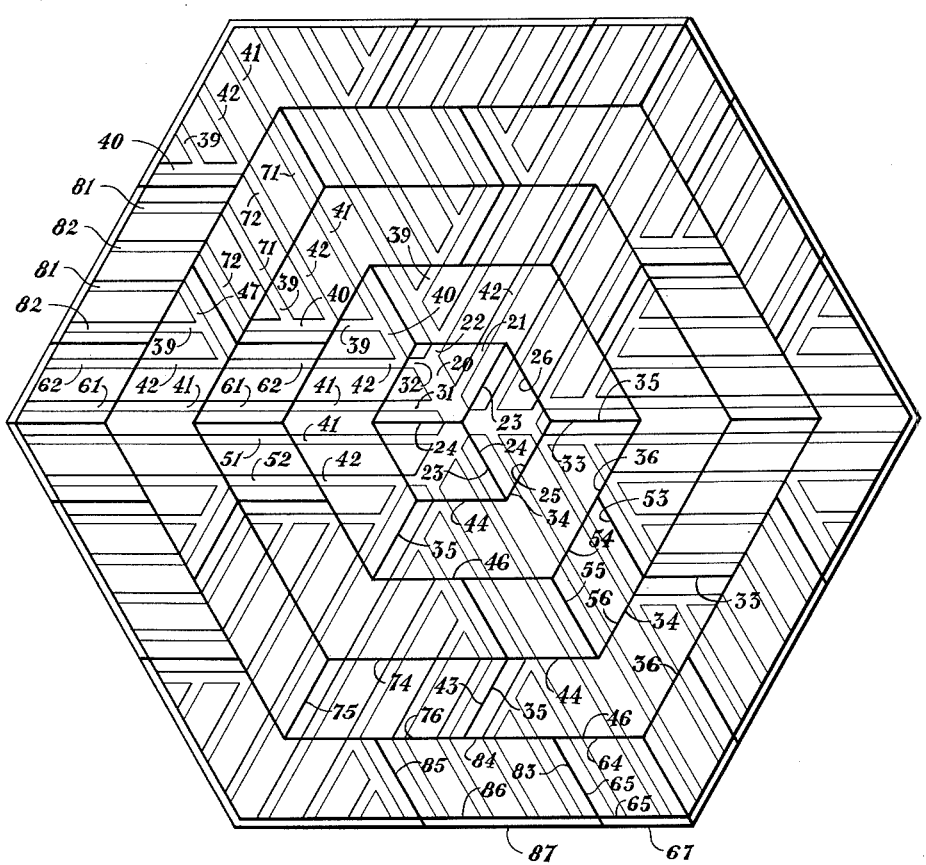
FIGURE 10 shows the channel network of the lower face of a distributor tray assembled from the plates shown in FIGURES 4, 5, 6, 7, 8, and 9.

The shape and size of the plates to be assembled together to form a tray and the method of assembly of these plates to obtain one embodiment of the invention will be more clearly understood from a detailed description of them which follows. The lower face of the plates with the required channeling to obtain a particular network illustrated in FIGURE 10 are shown in FIGURES 4, 5, 6, 7, 8, and 9. The centerpiece-forming plate, illustrated in FIGURE 4, is rhombic shaped with angles of 60 to 120 degrees between its adjacent edges. It may be made in various sizes and thicknesses. Channeling of a particular form is provided on the lower face. As shown, primary recessed channel 20 extends diagonally down the shortest diagonal almost to the opposite corner. Secondary channels 21, 22, 31, 32, branch off from the primary channel at angles of 120 degrees and extend to the respective edges of the plate as shown. Channels 31 and 32 are parallel to edges 25 and 23, while channels 21 and 22 are parallel to edges 26 and 24. Each of the channels 31 and 32 are spaced less than 0.85 times the thickness of the piece from edges 23 and 25, respectively. Likewise, channels 22 and 21 are spaced the same distance as channels 31 and 32 from the corresponding edges. The space between the secondary channels 31 and 32 and between channels 21 and 22 is less than 1.9 times the thickness of the piece. A tongue and groove arrangement is shown as a means for interlocking this plate with other plates. Tongue 27 is shown on edges 23, 26, and 25, while edge 24 is grooved.

A left-handed plate shown in FIGURE 7 (note in FIGURE 6 being right-handed) is also rhombic in shape and of the same size as a rhombic shaped centerpiece-forming plate. This plate differs from the centerpiece-forming plate in that the channeling and the arrangement of the tongue and grooves on its edges are different. Straight recessed channels 61 and 62 extend from edge 44 to 66 and are parallel to edges 63 and 65. These channels are the same size and have the same spacing from the edges and between them as the secondary channels of the plates shown in FIGURE 4. Edges 66 and 63 are constructed with tongue 67 and a mating groove 68 is provided in edges 64 and 65. By abutting together appropriate sides of two of these plates there is formed a left-handed parallelogram shaped plate shown in FIGURE 8. FIGURE 6 shows the lower face of a right-handed rhombic shaped plate which is the same as a plate shown in FIGURE 7 except that the angles are just opposite of this plate or, viewed in plain, may be considered as a mirror image of the left-handed plate. Likewise, by appropriately combining two of the plates illustrated in FIGURE 6, a right-handed parallelogram form is obtained as shown in FIGURE 9.

The lower surface of a chevron-like plate is shown in FIGURE 5. This plate has two long edges 36 and 46 of equal length which are adjacent to one another and meet at angle 47 to form an apex for the plate, two short edges 34 and 44 of equal length which are adjacent to one another and each being parallel to one of the long edges, and two outer edges 33 and 35 of equal length between the long and short edges. The outer edges and the long edges meet at acute angles 43. These chevron-like plates may be formed by joining two isosceles trapezoid-shaped plates, similar to that shown in FIGURE 3, at the non-parallel edges. For example, if two plates as shown in FIGURE 3 are combined at edges 113 and 115, respectively, the chevron-like plate is obtained with the joint between the trapezoid-shape plates falling on centerline 45 through the apex of the chevron-like plate. In this particular embodiment, edges 36 and 46 are twice the length of one side of said rhombic plate, while edges 33, 35, 34, and 44 are equal in length to one of the edges of the rhombic plate and angles 43 and 47 are 60 and 120 degrees, respectively. This plate has a recessed channel parallel to each of the outer edges of the chevron-like piece spaced less than 0.85 times the thickness of the piece from the edge which are indicated by number 40. Channels 39, 41 and 42 are parallel to the centerline through the apex of the chevron-like piece and are spaced apart less than 1.9 times the thickness of the piece. Channels 39 which intersect channels 40 are terminated at the intersection of these two channels. Edges 34, 44, and 35 are provided with a groove and the other edges a tongue.

In the assembly of this particular embodiment, the plates shown in FIGURES 4, 5, 6, 7, 8, and 9 are assembled to form a series of elements which are used in the construction of the tray, the lower face of which is shown in FIGURE 10. The arrangement of these individual plates and the interconnection of the channels are distinctly shown in this figure. The first element, a hexagonal-shape centerpiece, is formed by combining 3 of the rhombic shaped centerpiece-forming plates shown in FIGURE 4. These pieces are combined by joining edge 23 of one of these pieces with edge 24 of another and interfitting the third rhombic piece with these two forming the hexagonal centerpiece. When these plates are thus interfitted, the primary channels 20 communicate with each other at the center of the centerpiece which can be seen in FIGURE 10. A second element, an internal ring-like arrangement of plates, is formed by using 3 chevron-like plates shown in FIGURE 5. These plates are assembled with the centerline 45 through the apex of these plates being placed in line with the corners of the centerpiece formed by abutment of the rhombic centerpiece-forming plates. When these three chevron-like plates are thus assembled, secondary channels 22 and 32 of the rhombic centerpiece-forming plates communicate with channels 42 of these plates and channels 21 and 31 with channels 41. If the chevron-like plates were shifted so that centerline 45 was in line with the alternate corners from that shown, the channeling of these plates would still interconnect with the secondary channels of the centerpiece. Channels 22 and 32 would communicate with channels 41 and channels 21 and 31 with channels 42. A third element is a series of intermediate ring-like arrangement of plates encompassing and interfitting with the internal ring-like arrangement or each preceding intermediate ring-like arrangements when more than one intermediate ring is employed. The first intermediate ring-like arrangement is constructed with three chevron-like plates and three each of the right-handed and left-handed rhombic plates shown in FIGURES 6 and 7. The chevron-like plates are placed with centerline 45 in line with the three outer corners of the internal ring-like arrangement formed by the abutment of two outer edges of the chevron-like plates used in the construction of the internal ring-like arrangement. Between the chevron-like plates, the rhombic plates, shown in FIGURES 6 and 7, are appropriately assembled at the other three outer corners of the internal ring to complete the first intermediate ring-like arrangement. When these plates are so interfitted, the channels 41 and 42 of the chevron-like plate used in the internal ring communicate with channels 51 and 61 and channels 52 and 62, respectively. Also, channels 39 of the chevron-like plate used in the internal ring communicate with channels 40 of the chevron-like pieces used in the intermediate ring, while channels 40 of the chevron-like plate used in the internal ring communicate with channels 41 of the chevron-like plate used in the construction of the intermediate ring. In the second intermediate ring-like arrangement, instead of using two rhombic plates shown in FIGURE 6 adjacent to one another and likewise two rhombic plates shown in FIGURE 7 together, the combined plates shown in FIGURES 8 and 9 are utilized. The third intermediate ring-like arrangement is constructed of plates shown in FIGURES 5, 8, 9, 6, and 7. In a similar manner, other successive intermediate ring-like arrangements of plates may be added until the desired size is reached. Also, if a smaller tray is desired than shown in FIGURE 10, the number of intermediate ring-like arrangements may be decreased or the intermediate ring-like arrangements eliminated and a tray of only the centerpiece and the internal ring-like arrangement of plates obtained.

In other embodiments of hexagonal shaped trays it is not necessary to use all of the basic plates utilized in assembling the tray shown in FIGURE 10. Additional plates were necessary in order to obtain a channel pattern extending radially from the center point of the plate as shown in FIGURE 10. Various channel patterns may be used on the lower face of these plates so that when they are assembled, they interconnect and communicate with the outlet or outlets of the tank or tower. A plurality of straight channels in the plates, as shown by dotted lines in FIGURES 2 and 3, may be provided so that when assembled a pattern is formed having a series of concentric hexagonal channels interconnected with cross-channels which provide passage to the outlet or outlets of the tank or tower. When such a channel network pattern is used, the number of basic plates necessary in the assembly of the tray may be reduced. However, it may be desirable to use more basic plates to obtain the particular radially extending channels shown in FIGURE 10, even though it is not as convenient. A more even distribution is obtained with the trays having this type of channel network.

A hexagonal tray similar to that shown in FIGURE 10, except with a different channel network may be constructed from only two basic plates. Thus, if desired, a tray of any size may be constructed with the two plates. These two basic plates are shown in FIGURES 2 and 3.

One of the basic plates is a rhombic shaped plate having angles of 60 and 120 degrees between its adjacent edges, a top view of which is shown in FIGURE 2. This plate may be used to form the hexagonal centerpiece and also used in the intermediate ring-like arrangements. The plate has recessed channels on its lower face which are shown by dotted lines in the figure and are numbered 100, 101, and 102. Channel 100 is a peripheral channel extending around the edges of the plate. Channel 101 extends from edge 104 to 106 and is equidistant from and parallel to edges 103 and 105, while channel 102 extends from edge 103 to 105 and is equidistant from and parallel to edges 104 and 106. Channels 101 and 102 intersect at the centerpoint of the plate and communicate with channel 100. This piece is provided with a groove around the edges of the piece numbered 108.

FIGURE 3 illustrates the other basic plate which is an isosceles trapezoid-shape plate having three edges 113, 114, and 115 equal in length to one of the edges of the rhombic shaped plate shown in FIGURE 2. The base edge 116 is approximately twice the length of an edge of the rhombic piece. Also, for this particular embodiment, acute angles 117 between base edge 116 and nonparallel edges 113 and 115 are equal to 60 degrees. This plate likewise has recessed channels on its lower face, a peripheral channel 110 extending around the periphery of the plate and channels 111, 112, 119 and 120. Channel 119 is located midway between edges 114 and 116, is parallel to edge 116, extends from edge 113 to edge 115, and communicates with channel 110. Channel 111 is centrally located between edges 113 and 115, and extends from edge 114 to edge 116 at right angles to these edges. This channel intersects channel 119 and communicates with the peripheral channel. Channel 112 is located midway between channel 111 and the peripheral channel on edge 115 and extends from edge 114 to edge 116. This channel, likewise, intersects channel 119 and communicates with the peripheral channel at edges 114 and 116. Channel 120 is similar to channel 112, but is located midway between the peripheral channel on edge 113 and channel 111. This isosceles trapezoid-shaped piece is likewise provided with groove 118 around the edges of the plate.

In the assembly of the hexagonal tray, the individual elements, which are the centerpiece, the internal ring-like arrangement, and series of the intermediate ring-like arrangements are constructed from these two basic plates. The hexagonal centerpiece is formed by joining 3 of the rhombic plates in a manner similar to that described in the formation of the centerpiece in the assembly of the tray shown in FIGURE 10. These plates are interlocked by insertion of a rod or dowel made of the same composition as a plate in the groove of both of the abutting plates. A typical groove and dowel combination which may be used for interlocking the plates is shown cross-sectionally in FIGURE 12-d wherein plates 121 and 122 having semicircular grooves 123 and 124, respectively, are abutted and a round dowel 125 inserted in the circular opening formed by the grooves. The internal ring-like arrangement of plates is formed by using the isosceles trapezoid-shaped plates shown in FIGURE 3. These plates are placed with edge 114 abutting one edge of the resulting hexagonal centerpiece. Thus, six of these isosceles trapezoid plates are required. These pieces are, likewise, interlocked together with the hexagonal centerpiece by use of the groove and dowel combination. After obtaining the internal ring, the first intermediate ring-like arrangement is formed by using six isosceles trapezoid-shaped plates and six rhombic plates. The second intermediate ring-like arrangement is composed of six trapezoid pieces and 12 rhombic pieces and each succeeding intermediate ring after this one requires 6 additional rhombic shaped plates for each additional ring. The trapezoid-shape plates and the rhombic-shape plates are assembled in a manner similar to that described in the construction of the tray shown in FIGURE 10, using two trapezoid-shape plates to form the equivalent of a chevron-like plate and using the rhombic-shape plate in FIGURE 2 and multiples thereof in place of the plates shown in FIGURES 6, 7, 8, and 9.

Figure 20:
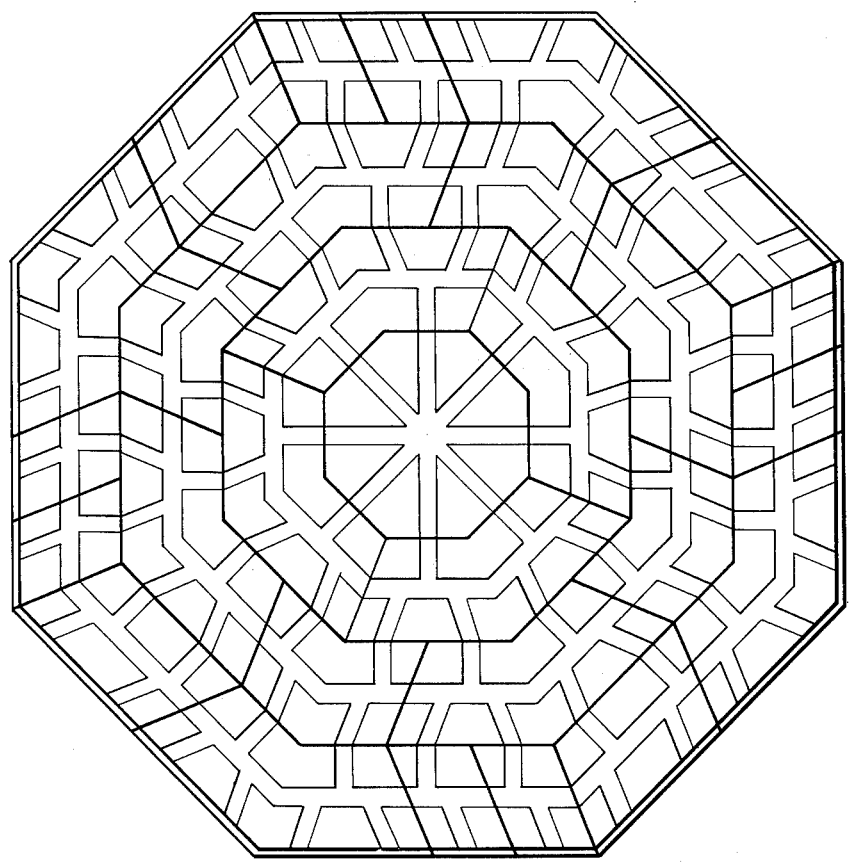
FIGURE 20 shows the upsidedown plan view of an octagonal tray assembled from the plates shown in FIGURES 14, 15, 16, 17, 18 and 19.

An embodiment of the invention obtaining an octagonal-shape tray is shown in FIGURE 20. The plates used in the construction of this tray are shown in FIGURES 14, 15, 16, 17, 18, and 19. Each of these plates with the exception of the plates shown in FIGURES 15 and 16, correspond to a particular plate used in the construction of the hexagonal-shape tray. A top view of the top surface of these individual basic plates is shown in these figures. The channeling on the lower face is not shown, but may be readily determined from the assembled plate illustrated in FIGURE 20 showing the lower face of the tray with the channeling.

Figure 14:
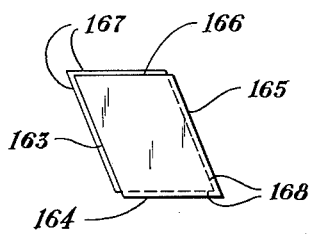
FIGURES 14, 15, 16, 17, 18 and 19 are plan views of plates used to obtain an octagonally shaped distributor tray.
Figure 15:
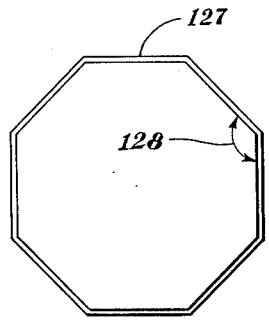
Figure 16:
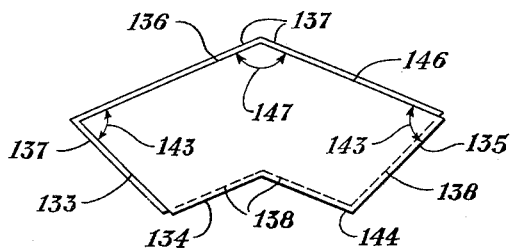
Figure 17:
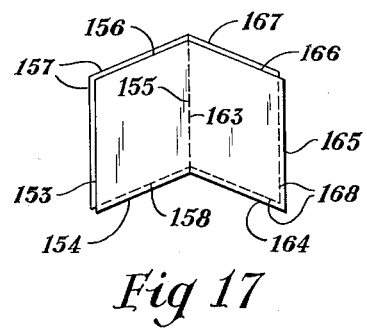
Figure 18:
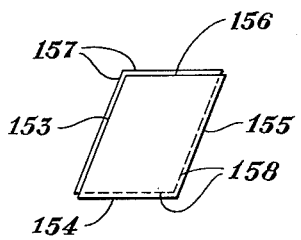
Figure 19:
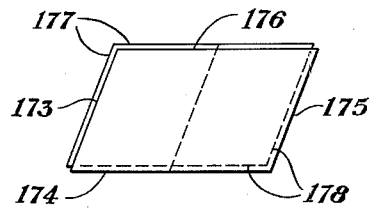

A regular octagonal-shape centerpiece is shown in FIGURE 15. This plate is provided with a tongue 127 on the edges extending around the periphery of the plate. This plate, as may be seen from FIGURE 20, has 8 channels on the lower face extending radially from the center to each of the edges. Another plate, shown in FIGURE 14, is a parallelogram-shape plate having acute angles of 67.5 degrees or ½ of the internal angle between the adjacent edges of the centerpiece. This plate corresponds to the rhombic plate shown in FIGURE 7. Edges 164 and 166 of this plate are equal in length to one of the edges of the octagonal centerpiece, while edges 163 and 165 may be of various length. Edges 163 and 166 are provided with tongue 167, while edges 164 and 165 are provided with groove 168. Corresponding to the plate shown in FIGURE 6, the plate illustrated in FIGURE 18 is the same in size and shape as the parallelogram plate illustrated in FIGURE 14 except that the angles are just opposite or if viewed plain is a mirror image of it. The plate, as shown in FIGURE 17, is obtained by appropriately combining a plate shown in FIGURE 18 with one shown in FIGURE 14 and FIGURE 19 by combining two of the plates shown in FIGURE 18. The chevron-like piece corresponding to the chevron-like piece used in the hexagonal tray construction is shown in FIGURE 16. The main difference between this chevron-like plate and the plate shown in FIGURE 5 is that the angles between the corresponding adjacent edges differ. For this plate acute angles 143 are equal to 67.5 degrees or to ½ of the internal angle between the adjacent edges of the centerpiece and angle 147 at the apex of the plate is 135 degrees or equal to the angle between two adjacent edges of the polygon centerpiece. Edges 134 and 144 of the chevron-like piece are equal in length to one edge of the octagonal-shape centerpiece, while edges 133 and 135 are equal in length to edge 163 or 165 of the plate shown in FIGURE 14. The length of the edges 136 and 146 will depend upon length of edges 133 and 135.

In the assembly of these basic plates, the centerpiece being formed in one piece is the first element. As in the hexagonal tray, the internal ring is formed by using the chevron-like pieces shown in FIGURE 16. Four of these plates, however, are required instead of three as for the hexagonal shaped tray. Theses four plates are interfitted with the centerpiece. The first intermediate ring-like arrangement of plates is constructed from the chevron-like plates shown in FIGURE 16 and the plates shown in FIGURE 17. Four of each is used and these pieces are alternately interfitted, encompassing the internal ring formed by four of the chevron-like plates. The second intermediate ring-like arrangement as shown in FIGURE 20 is obtained by using four of the chevron-like plates, four of the plates shown in FIGURE 19, and eight of the plates shown in FIGURE 14. The location of these individual plates may be distinctly seen in FIGURE 20. Additional intermediate rings may be added if a larger tray is desired.

In other embodiments of the invention, other even numbered edge regular polygon shaped trays may be obtained. When a tray shaped other than the particular shaped hexagonal trays described above are employed, the centerpiece is generally formed in one piece or is assembled from plates having special shapes to form the centerpiece. The centerpiece plates are of different shape than those used in other portions of the tray. In the particular hexagonal tray, as shown in FIGURE 10, the plates forming the centerpiece are of the same shape as the rhombic pieces used in the intermediate ring-like arrangements. In the tray assembled from the plates shown in FIGURES 2 and 3, the plates used in assembly of the centerpiece are the same as those used in the intermediate rings. The fact that the same shaped plates or the same plates used to form the centerpiece may be used in the intermediate ring-like arrangement is not inherent to the hexagonal shaped tray but is due to the particular ratio of the width of the plates selected to the length of one edge of the hexagonal centerpiece. The width of the plates selected are such that the longest edges of the chevron-like plates are twice the length of an edge of the hexagonal centerpiece and the outer edges are equal to an edge of the hexagonal centerpiece. Thus, the plates shown in FIGURES 6 and 7 are also rhombic in shape. The advantage of using this particular ratio is that a smaller number of different shaped forms are required for casting or forming of the plates. If a different width had been selected, the plates shown in these figures would have had the shape of a parallelogram with angles of 60 and 120 degrees between its adjacent edges, two of the edges being equal in length to an edge of the centerpiece and the other two edges of different length.

Thus, the shapes of the basic plates used in the assembly of the distributor trays are: The centerpiece or the plates necessary to form the centerpiece; an isosceles trapezoid-shaped plate, or the chevron-like plate obtained by joining two of the trapezoid shaped plates at non-parallel edges; and a parallelogram-shape plate having two edges equal in length to an edge of the even numbered edge regular polygon used as the centerpiece and the other two edges of a selected desired length. In the trapezoid shaped plates or the chevron-like plates, the acute angles between adjacent edges must be equal to ½ of the angle formed between adjacent edges of the polygon centerpiece. For example, the acute angles of the chevron-like plate are indicated in FIGURE 16 as angles numbered 143 and the angle between adjacent edges of the centerpiece by angle numbered 128. Also, the short edge of the trapezoid-shape plate which is parallel to the base or the short edges of the chevron-like plate which are parallel to the longest edges of the chevron-like plate must be equal in length to one edge of the regular polygon used as the centerpiece. The outer edges of the chevron-like plate or the non-parallel edges of the trapezoid-shape plate must also be of the same length as the desired length selected for the two edges of the parallelogram.

The plates used in the assembly of the distributor trays may be formed by casting in molds, shaped by pressing or other means. The synthetic resin compositions may be those described in the above cited patents or other synthetic resin compositions with or without an inert granular filler may be used. For example, thermoplastic resins as well as self-hardening thermosetting resins, such as epoxy resins containing a setting catalyst may be employed. Thermoplastic resins, such as styrene, in granular form, may be compressed and subjected to a sufficient amount of heat to soften the plastic so that the granular particles will adhere to one another. In this manner porous compositions of thermoplastic material may be obtained without a granular filler which may be used for the construction of these trays.

In the fabrication of the plates, the channels on the lower face are generally formed by using a mold or form having raised ridges to give the required channels. However, if desired, the plates may be formed without the channels and the channels later cut into the plates. The width and depth of the channels required will depend on the thickness of the plates and porosity of the composition used in the formation of the plates. With a more porous composition, a greater flow may be maintained through the plate and thus larger channels are required. Channels approximately 1½ inches wide and ¾ inch deep are generally used for plates of approximately 2½ inch thickness. It is also generally preferred not to have over ½ of the total lower surface area of the tray utilized in channels. In the installation of the plates to form the tray, the plates are cemented to the bottom of the tank or tower and, if a large surface area of the lower face is devoted to the channels, the surface available for binding the plate to the support is decreased. Further, these channels must be spaced such that when the units are assembled the channels are spaced apart less than 1.9 times the thickness of the plate. If the distance between the channels is greater than 1.9 times the thickness, uneven flow distribution in backwashing or backblowing is obtained. Reduced rate of flow is obtained through the plate at a point midway between the channels.

The plates may be formed in different sizes as long as the required relationship between the individual plates is maintained. For small laboratory type tanks or towers, it may be desirable to construct these individual plates in relatively small sizes. However, in commercial units, it is generally desirable to form the plates as large as possible to facilitate the assembly of the tray. It is for this reason that the trapezoid-shaped plates are generally combined to form the chevron-like plate and the parallelogram plates as shown in FIGURES 8 or 9 obtained by combining two of the rhombic plates shown in FIGURES 6 or 7 are used. When a large number of intermediate ring-like arrangements is used, it may be desirable to combine more than just two of the plates shown in FIGURE 6 and FIGURE 7. Since in mose of the commercial towers and tanks the access to the tank is through a manhole, it is desirable to construct these plates of such size that they will easily pass through the manhole.

While the thickness of these plates may be varied, the trays are assembled from plates of the same thickness. For most of the commercial tanks and towers, a thickness in range from 2 to 3 inches is generally used. With the thickness in this range, sufficient strength and relatively low pressure drop through the tray are obtained.

Although different means may be used for interfitting and interlocking of the individual plates and elements, a semi-circular tongue and groove arrangement as shown in FIGURE 12–a is preferred. For plates 2 to 3 inches thick the size of a tongue and groove may be from ¾ to 1 inch. For pieces considerably thicker than 2 to 3 inches, a two tongue and groove arrangement in parallel on the edges may be used. With a tongue and groove joint, a good seal is obtained and the pieces may be readily assembled. The joint between the pieces is chiefly vertical and the distribution properties of the tray is not generally impaired. FIGURE 12 in views b and c shows some of the other means which may be used to interfit or interlock the plate which have not been discussed. View b illustrates a typical shiplap arrangement and a plain slant edge means is shown in view c.

In the installation of these distributor trays, the plates are cemented, preferably to a flat surface, with the recessed channels on the lower surface of the plates communicating or interconnecting to the discharge from the tank or tower. In flat bottom tanks a layer of carbon, graphite, or low porosity acid resistant brick may be laid to protect the metal and these resin composition plates cemented to this brick. For towers with dished heads or other curved heads, concrete may be used to fill the dish or curvature part of the head to obtain a flat surface. FIGURE 1 shows a cross-sectional view of such an installation. Often in ion exchange operations to prevent the liquids which are being treated from coming in contact with metals and to prevent these liquids from attacking the concrete, an inert liner 8 may be installed in nozzle 9 extending through the concrete and the cemented brick.

A cement consisting of the synthetic resin used in forming these plates may also be used to cement the plates together and bind them to the brick. This cement is mixed in consistency such that it can be troweled on the brick and on the plates to be laid. It is often desirable to first assemble the tray in the tower before applying the cement. Since most of the tanks and towers are circular, it may be desirable to cut some of these pieces to obtain the circular shape. These compositions may be easily cut with a hacksaw or a power saw generally adapted for cutting metal, or a thin abrasive wheel. Thus, when these plates and elements are first interfitted without the cement, it is possible to fit these pieces by cutting, grinding, or filing. Although it is generally preferred to cut the pieces to obtain a circular design, if desirable, however, an outer ring consisting of circular segments to convert the regular polygon shaped tray to a circular shape may be used. A circular segment used for such purpose to convert a hexagonal shaped tray to a circular is shown in FIG. 11. After the pieces have been laid in the tower and fitted, they are taken up, the cement applied, and re-laid.

A single regular polygon shaped tray, as shown in FIG. 10 for the hexagonal tray and FIG. 20 for the octagonal tray, may be used for towers up to 12 feet in diameter. A plurality of these polygon shaped trays are used as individual components to build up a tray for towers having diameters which are greater than 12 feet. Generally in towers of 12 to 30 feet in diameter, seven of the components are assembled to form the tray. Thus, these large towers are equipped with seven outlets, one for each of the components.

To test the distribution pattern of a tray constructed from plates according to the invention, a 5 foot tray assembled from plates similar to those shown in FIGS. 4, 5, and 11 was installed in a five foot tower. The plates were made of a composition described in above cited patent No. 2,670,339, using a granulated coke as inert filler and were of a size such that the edges of the rhombic pieces were approximately 13⅞ inches in length. These plates were 2½ inches thick with channels ¾ inch deep on the lower face. The primary channel in the centerpiece-forming rhombic plate was 3½ inches wide and the secondary channels and all other channels were 1½ inches wide. The channels were spaced 2¼ inches from the parallel edge, for channels next to the edges, and 4½ inches between the channels. The plates and elements were interfitted and interlocked by use of a ¾ inch semicircular tongue and groove combination.

Air was passed through the bottom of the tray when about 1 inch of water was maintained on top of it. A uniform distribution of bubbles indicated that uniform distribution was obtained with the tray. There was no evidence of any area being blanketed out due to assembly or joining the plates or any area through which exceptionally large amount of air was passed.

Thus, by preforming a few basic plates and assembling these plates into a porous distributor tray, these compositions may be conveniently employed for distribution trays for ion exchange resin or filter medium beds. In backwashing or backblowing of the beds even distribution over the whole plate is obtained. No resin is lost through the plate and the bed remains level. These plates are assembled and cemented to carbon, graphite or acid resistant brick and do not have to be bolted down or other metal type fasteners used. Thus, these trays are especially desirable in processing liquids where presence of metal is deleterious in the product.

What is claimed is:

An assembly of a porous composite distributor plate of a self-hardening synthetic resin composition and substantially inert granular filler comprising at least one integral component which consists of a plurality of interfitting elements having an upper and lower face, said elements having a plurality of recessed channels upon its lower face covering not greater than half of the area of the lower face, one of said elements being a hexagonal-shape centerpiece consisting of three interfitting center-forming rhombic plates, each of said center-forming rhombic plates having angles of 60 and 120 degrees between adjacent edges, each of said center-forming rhombic plates having a primary recessed channel on its lower face extending from one corner of the piece along the shortest diagonal toward the opposite corner which when the pieces are interlocked to form the hexagonal centerpiece are in communication with one another and having a plurality of secondary straight recessed channels on its lower face branching off the primary recessed channel at angles of 120 degrees, said secondary channels being parallel to one edge of said piece and being spaced so that the distance between the parallel edges of the piece and the channel is not greater than 0.85 times the thickness of said plate and the distance between the secondary channels is less than 1.9 times the thickness, another of said elements being an internal ring consisting of three chevron-like interfitting plates encompassing and interfitting with said hexagonal-shape centerpiece with each chevron-like piece encompassing the corner of the hexagonal centerpiece formed by meeting of the center-forming rhombic plates, each of said chevron-like plates having two long edges adjacent to one another and meeting at an angle of 120 degrees to form an apex for the plate, two short edges each being parallel to one of said long edges, and two outer edges between said long edges and short edges each meeing one of said long edges at an angle of 60 degrees, said long edges being equal in length to twice the length of an edge of said center-forming chamber plate, said short edges and said outer edges being equal in length to an edge of said center-forming rhombic plate each of chevron-like plates having, on its lower face, a recessed channel parallel to each of the outer edges of the chevron-like plates spaced less than 0.85 times the thickness of the chevron-like plate from said outer edges, said channels communicating with the secondary recessed channels of the hexagonal-shape centerpiece when interfitted with said centerpiece and a plurality of straight recessed channels, parallel to a center line through the apex of the chevron-like plate spaced less than 1.9 times the thickness of said chevron-like plate with the straight recessed channels which intersect said recessed channels parallel to said outer edges being terminated at the intersection and the remaining recess channels communicating with the secondary recess channels of the hexagonal-shape centerpiece when the chevron-like plate is interfitted with said centerpiece, a third of said elements being at least one intermediate ring-like arrangement of plates consisting of said chevron-like plates interfitted with left-handed rhombic-shape plates having edges equal in length to an edge of said center-forming rhombic piece and a right-handed rhombic-shape plate having edges equal in length to an edge of said center-forming rhombic plate, each of said left-handed rhombic-shape plates having angles of 60 and 120 degrees between adjacent edges and having a plurality of recessed channels on its lower face parallel to two edges, said channels being spaced at a distance less than 0.85 times the thickness of the plate from edges parallel to said channels and less than 1.9 times the thickness between the centers of the channels, each of said right-handed rhombic-shape plates having angles of 60 and 120 degrees between adjacent edges just opposed to that of said left-handed rhombic-shape plate and having a plurality of recessed channels parallel to two edges, said channels being at a distance less than 0.85 times the thickness of the plate from edges parallel to said channels and less than 1.9 times the thickness between the centers of said channels, said chevron-like plates and said left-handed rhombic-shape plates and said right-handed rhombic-shape plates being interfitted encompassing and interfitting with the internal ring-like arrangement of plate with each chevron-like plate being disposed to encompass the corner of the preceding ring-like arrangement formed by meeting of two plates, said chevron-like plates and said left-handed and right-handed rhombic-shape plates being so disposed so that the recessed channels of the plates are in communication with channels of the internal ring and each preceding intermediate ring-like arrangement of plates.

References Cited in the file of this patent

FOREIGN PATENTS

| 772 | Great Britain | 1909 |
| 1,143 | Great Britain | 1905 |

OTHER REFERENCES

"Porous Media," page 28, Form No. 5118 by the Carborundum Company, Perth Amboy, N.J., October 27, 1950.